(12) United States Patent
Adams et al.

(10) Patent No.: US 6,490,070 B1
(45) Date of Patent: Dec. 3, 2002

(54) METHOD AND APPARATUS FOR POLARIZATION TRACKING IN WIRELESS OPTICAL COMMUNICATION SYSTEMS

(75) Inventors: Jeffrey C. Adams, Seattle, WA (US); Mark Pratt, Seattle, WA (US); Micah J. Barclay, Redmond, WA (US)

(73) Assignee: Terabeam Corporation, Kirkland, WA (US)

( * ) Notice: Subject to any disclaimer, the term of this patent is extended or adjusted under 35 U.S.C. 154(b) by 0 days.

(21) Appl. No.: 09/627,279

(22) Filed: Jul. 28, 2000

(51) Int. Cl.$^7$ .......................... H04B 10/00; H04B 10/04
(52) U.S. Cl. ..................... 359/156; 359/154; 359/155; 359/159; 359/172; 359/181
(58) Field of Search .................................. 359/110, 122, 359/156, 181, 158, 184, 172, 159, 152, 154, 143, 155

(56) References Cited

U.S. PATENT DOCUMENTS

| | | | | |
|---|---|---|---|---|
| 3,569,715 A | * | 3/1971 | Horning ...................... | 250/199 |
| 3,971,930 A | * | 7/1976 | Fitzmaurice et al. ........ | 250/199 |
| 4,633,315 A | | 12/1986 | Kasperkovitz | |
| 5,023,948 A | * | 6/1991 | Smith .......................... | 455/616 |
| 5,062,150 A | | 10/1991 | Swanson et al. | |
| 5,142,400 A | * | 8/1992 | Solinsky ...................... | 359/159 |
| 5,355,381 A | * | 10/1994 | Leilabady ..................... | 372/28 |
| 5,539,557 A | | 7/1996 | Horiuchi et al. | |
| 5,576,871 A | * | 11/1996 | Nimura et al. ............... | 359/110 |
| 5,627,669 A | * | 5/1997 | Orino et al. ................. | 359/156 |
| 5,633,959 A | * | 5/1997 | Niki et al. ..................... | 385/11 |
| 5,710,652 A | | 1/1998 | Bloom et al. | |
| 5,777,768 A | | 7/1998 | Korevaar | |
| 5,790,291 A | | 8/1998 | Britz | |
| 5,808,768 A | * | 9/1998 | Tadakuma et al. .......... | 359/156 |
| 5,946,119 A | | 8/1999 | Bergano et al. | |
| 6,023,362 A | * | 2/2000 | Walker et al. ............... | 359/180 |
| 6,025,948 A | | 2/2000 | Gautheron | |
| 6,057,950 A | * | 5/2000 | Bergano ...................... | 359/181 |
| 6,091,528 A | | 7/2000 | Kanda | |
| 6,097,522 A | | 8/2000 | Maerki et al. | |
| 6,271,953 B1 | | 8/2000 | Dishman et al. | |
| 6,141,140 A | * | 10/2000 | Kim ............................ | 359/281 |
| 6,219,133 B1 | | 4/2001 | Kawase et al. | |

* cited by examiner

*Primary Examiner*—Jason Chan
*Assistant Examiner*—M. R. Sedighian
(74) *Attorney, Agent, or Firm*—Blakely Sokoloff Taylor & Zafman LLP

(57) ABSTRACT

A polarization of a light signal is modulated to provide polarization tracking in a wireless optical communication system. The light signal having the modulated polarization, such as a sinusoidally varying polarization, is transmitted from an optical transmitter having polarization-maintaining fiber. The light signal having the modulated polarization is received at an optical receiver. A portion of the light signal is directed to an analyzer that detects the modulated polarization and generates an amplitude-modulated light signal corresponding to the modulated polarization. The amplitude-modulated light signal is directed to a tracking detector, such as a quad cell detector, that generates an amplitude-modulated electronic signal corresponding to the amplitude-modulated light signal. The amplitude-modulated electronic signal can be subsequently used to control or perform tracking of the optical receiver. Such tracking can include adjustment of an orientation of the optical receiver with respect to the light signal received from the transmitter.

40 Claims, 7 Drawing Sheets

METHOD AND APPARATUS FOR POLARIZATION TRACKING IN WIRELESS OPTICAL COMMUNICATION SYSTEMS

BACKGROUND OF THE INVENTION

1. Field of the Invention

The present invention relates generally to communication systems, and in particular, relates to polarization tracking in wireless optical communication systems.

2. Background Information

With the increasing popularity of wide area networks, such as the Internet and/or World Wide Web, network growth and traffic have exploded in recent years. Network users continue to demand faster networks, and as network demands continue to increase, existing network infrastructures and technologies are reaching their limits.

An alternative to existing hardwire or fiber network solutions is the use of wireless optical telecommunications technology. Wireless optical telecommunications utilize beams of light, such as lasers, as optical communications signals, and therefore do not require the routing of cables or fibers between locations. Data or information is encoded into a beam of light, and then transmitted through free space from a transmitter to a receiver.

For point-to-point free space laser communications, the use of narrow optical beams provides several advantages, including data security, high customer density, and high directivity. High directivity makes the achievement of high data rates and high link availability easier, due to higher signal levels at a receiver. In order to take full advantage of this directivity, some form of tracking is often necessary to keep the antennas of a transmitter and of the receiver properly pointed at each other. For example, a transmitted optical beam with a 1-mrad divergence has a spot diameter at the receiver of about 1 meter at a 1 km range. Thus, movement of the transmitter or receiver by even a small fraction of the divergence (or field-of-view) could compromise the link unless active tracking is employed. Since high-speed communication channels utilize extremely sensitive detectors, such systems require equally sensitive tracking systems.

Charge coupled device (CCD) arrays or quadrant cell optical detectors (sometimes referred to as "quad cells") may be used as tracking detectors in a tracking system. In either case, an electrically controllable steering mirror, gimbal, or other steering device may be used to maximize an optical signal (e.g., light) directed at a high speed detector, based on information provided by the tracking detector. This is possible since optical paths for tracking and communication are pre-aligned, and the nature of a tracking signal for a perfectly aligned system is known. CCD tracking is very sensitive, offers potentially more immunity to solar glint because of the ability to ignore glint "features" on the CCD array, and is in general a well-proven tracking method. However, at certain wavelengths, a lower wavelength tracking beam is often necessary due to limitations of CCD detection systems.

In the case of quad cells, for an aligned optical system, an equal signal in all four quadrants will normally indicate that the steering mirror has optimally directed the optical communication signal onto the high-speed detector—if there is any deviation from this, the steering mirror will direct the optical signal back to this optimum equilibrium.

The signal on the quad cells may be direct current (DC). DC tracking may use the average signal content of the communications channel from each quad cell. A problem with DC is that quad cell electronics cannot distinguish between an actual optical signal and a signal that may have come from solar background radiation or from imperfect transmit/receive isolation. Thus, the tracking system may misalign the transmitter and receiver in the presence of background light.

Collectively, these tracking methods often suffer from disadvantages including bulkiness, expense, complexity, and inaccuracy or imperfect performance. Accordingly, improvements are needed for tracking in wireless optical communication systems.

SUMMARY OF THE INVENTION

According to one aspect of the invention, a method is provided that includes modulating a polarization of a light signal, and transmitting the light signal having the modulated polarization. The light signal having the modulated polarization is received, and an amplitude-modulated light signal based on the modulated polarization is generated. The amplitude-modulated light signal is used to perform tracking of a receiver with respect to the received light signal.

BRIEF DESCRIPTION OF THE DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

Embodiments of a system and method for polarization tracking in a wireless optical communication system are described in detail herein. In the following description, numerous specific details are provided, such as the identification of various system components in FIG. 1, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "tracking" as used herein, is intended to have a meaning like that understood by those skilled in the art. That is, the term "tracking" more or less includes the monitoring, processing, and adjustment of an orientation of an optical receiver (and/or an orientation of its component parts) with respect to a received optical signal. In this manner, tracking allows the optical receiver to remain substantially aligned with the received optical signal, thereby resulting in maximum reception performance at the optical receiver.

An embodiment of the invention uses polarization tracking in order to obtain an alternating (AC) tracking signal, so that the AC tracking signal can be subsequently used to adjust an orientation of an optical receiver with respect to a received optical transmission signal. The optical transmission signal can comprise laser light and the like, at 1548.1 nm, for example. The optical transmission signal is not limited to being monochromatic or to any particular wavelength or color, and may include visible light as well as ultraviolet or infrared (IR) portions of the spectrum.

The embodiment involves modulation of the polarization of the optical transmission signal at an optical transmitter, and then, at the optical receiver, using a polarization analyzer positioned in front of a quad cell detector to turn the modulated polarization into an AC amplitude modulated optical signal for tracking. Since the AC amplitude modulation can use a simple sinusoidal tone, a narrow-band electronic filter could be used on resulting signals generated by the quad cell detectors to greatly reduce out-of-band noise.

Figure 1:
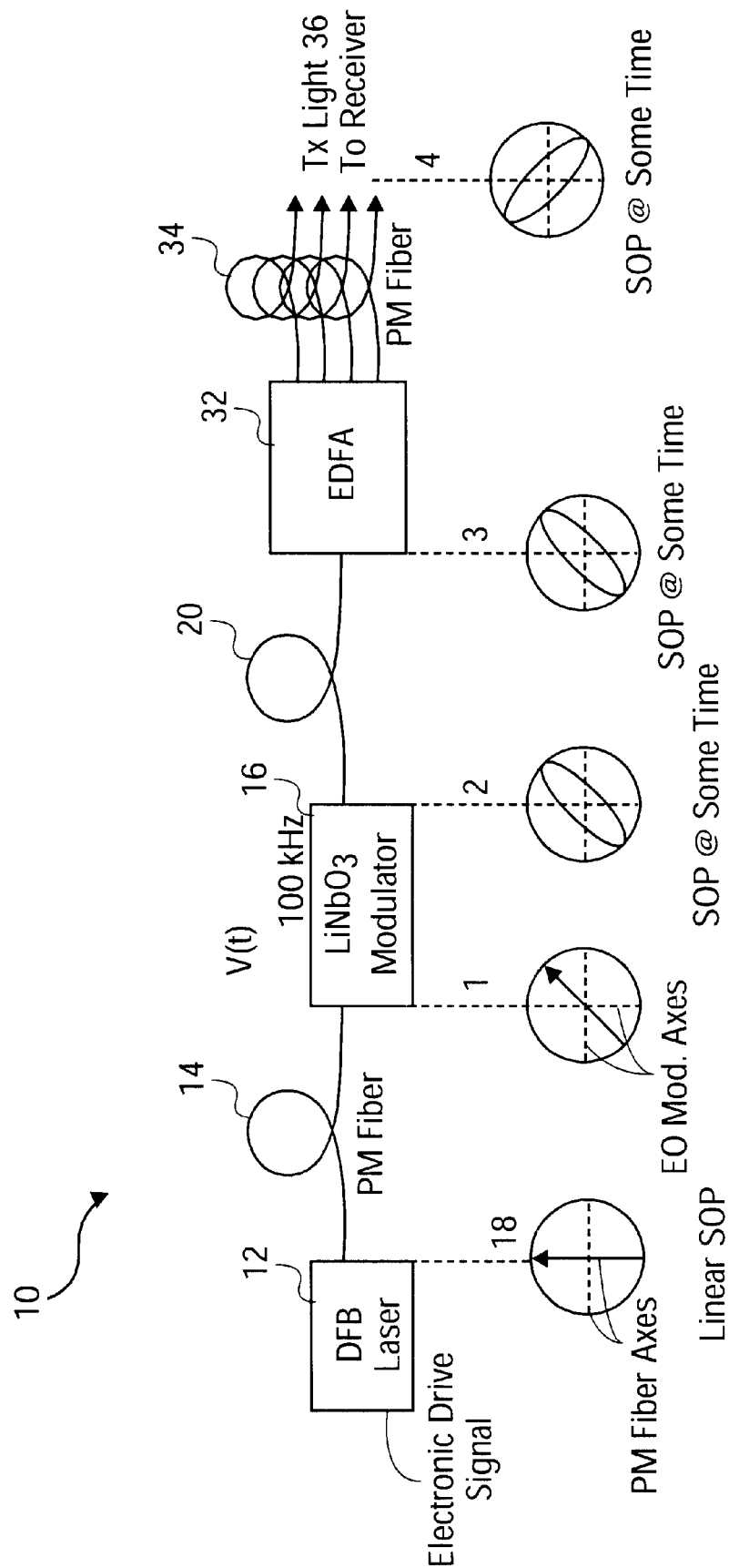
FIG. 1 is a functional block diagram showing an embodiment of a transmitter that uses polarization modulation, and further showing diagrams of corresponding polarization states.

An embodiment of a transmitter that can provide these features is shown generally at 10 in FIG. 1. A laser source, such as a suitable commercially available distributed feedback (DFB) laser 12, is powered by an electronic drive signal and is provided with a polarization-maintaining (PM) fiber 14 (sometimes referred to as a "pigtail"). If additional power is required, due to optical insertion losses from other components of the transmitter 10, a DFB laser 12 with more power than conventional DFB lasers may be used. The PM fiber 14 is connected to an input of an electro-optic modulator 16, such as a lithium niobate (LiNbO$_3$) modulator. The modulator 16 can modulate the incoming laser signal with a sinusoidal 100 kHz modulating signal V(t), for example, and it is understood that the modulating signal V(t) can have other frequencies and need not necessarily be a sinusoidal signal (e.g., the modulating signal V(t) can be a triangle wave, square wave, etc).

The PM fiber 14 of the DFB laser 12 produces an output laser light having a linear state of polarization (SOP), which may be vertical with respect to the axes of the PM fiber 14, as shown in a diagram 18 of FIG. 1. The resulting input to the modulator 16 is keyed such that the linear polarization coming out of the PM fiber 14 illuminates the axes of the modulator 16 (functioning as an LiNbO$_3$ waveguide) at 45 degrees, as shown by a diagram 1 of FIG. 1.

A PM fiber 20 exiting the modulator 16 has its axes aligned with the modulator axes. The PM fiber 20 may be the same as the PM fiber 14, or in another embodiment, the PM fiber 20 is not used.

If a sinusoidal voltage, such as the modulating signal V(t), is applied to the modulator 16, a sinusoidally varying polarization state is produced at the output of the modulator 16, which varies over π radians. The applied voltage V(t) effectively creates an electrically induced birefringence in the LiNbO$_3$ waveguide—its axes of birefringence or eigenaxes are illuminated equally with a 45-degree linear input polarization. Stated differently, the modulator 16 can comprise a waveguide or crystal that has electrically controllable birefringence. This produces a SOP of the laser light that sweeps from linear vertical, to elliptical, to circular, to elliptical in another direction, to linear horizontal, as shown in diagrams 2–3 of FIG. 1 and in diagrams 22–30 of FIG. 3.

This modulated polarization state can be fed to an input of an amplifier, such as a polarization maintaining erbium-doped fiber amplifier (EDFA) 32, to amplify the incoming laser light. In another embodiment, the EDFA 32 need not be used. The EDFA 32, in turn, can be provided with a plurality of PM fibers 34, each corresponding to a separate transmission link. Laser light(s) 36 outputted from the PM fibers 34 (e.g., the light transmitted to an optical receiver) can have a SOP shown at a diagram 4 at some instance in time.

Figure 2:
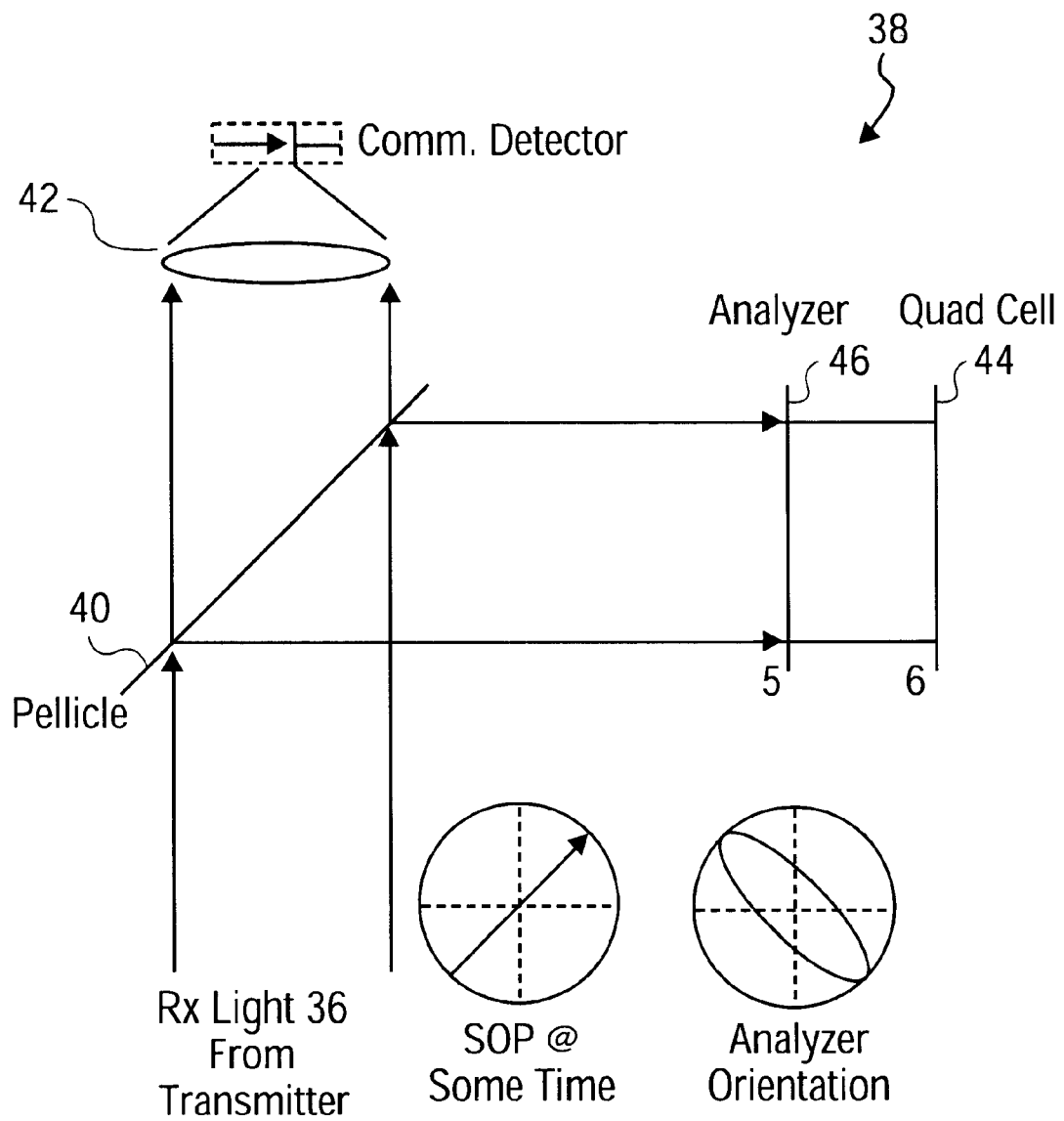
FIG. 2 is a functional block diagram showing an embodiment of a receiver that can use the polarization modulation from the transmitter of FIG. 1 to perform tracking, and further showing diagrams of corresponding polarization states.

Referring next to FIG. 2, shown generally at 38 is an embodiment of an optical receiver (or a portion thereof) 38 that can receive and process the laser light 36 transmitted from the transmitter 10. The laser light 36 received by the receiver 10 has its polarization modulated in a manner such as that described above with reference to FIG. 1. For the sake of clarity and simplicity of explanation, other components of the receiver 38 are not shown in FIG. 2. Such components can include, for example, lenses, mirrors, holographic optical elements, filters, etc.

At the receiver 38, the laser light 36 is first directed to a beam splitter 40, which in one embodiment can comprise a pellicle. The beam splitter 40 functions to split the incoming laser light between a communication detector 42 and a tracking detector, such as a quad cell detector 44. In one embodiment most of the laser light 36 is directed to the communication detector 42, and it is understood that the beam splitter 40 can be designed to split the laser light 36 into any suitable ratio (e.g., 75% to the communication detector 42 and 25% to the quad cell detector 44).

The communication detector 42 and/or quad cell detector 44 can comprise any type of suitable photosensitive device, such as photo diodes, avalanche photo diodes, charge coupled devices (CCDs), etc. Furthermore, although a quad cell 44 is described herein as having four optical detectors corresponding to each quadrant, it is to be appreciated that the detector 44 can have any number of detectors and/or regions that detect incident light.

According to an embodiment of the invention, a properly oriented analyzer 46 is positioned in front of the quad cell detector 44. The analyzer 46 can be any suitable commercially available device that can detect a polarity of an incoming light. The analyzer 46 has an axis of transmission, such as that shown in a diagram 6 of FIG. 2, and the analyzer 46 passes the maximum amount of light when the light has a polarization that is aligned with the axis of transmission of the analyzer 46. When there is less alignment, there is less light passed by the analyzer 46. Therefore, given the laser light 36 that has a sinusoidally varying SOP (e.g., a modulated polarization that changes its ellipticity), such as that shown in a diagram 5 in FIG. 2, the analyzer 46 can produce a resulting output light signal that has a sinusoidal amplitude modulation, such as a tone signal corresponding to the signal V(t) at 100 kHz of FIG. 1.

Figure 3:
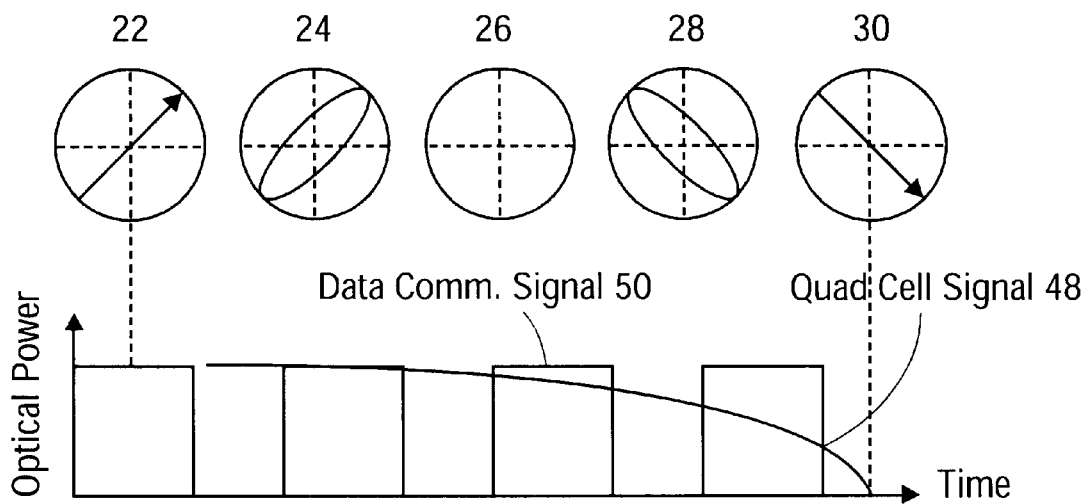
FIG. 3 shows signal diagrams of optical power versus time for an optical data communication signal from the transmitter of FIG. 1 and for a tracking signal from the receiver of FIG. 2, and further shows diagrams of corresponding polarization states.

This amplitude-modulated light signal is then directed to the quad cell detector 44. The relative strength (e.g., power, amplitude, etc.) of the amplitude-modulated light signal incident on each of the quadrants of the quad cell detector 44 can then be converted into a corresponding electronic AC signal (e.g., an electronic signal including a tracking signal), which is subsequently used to determine whether the receiver's 38 orientation with respect to the transmitter 10 and/or to the laser light 36 has to be adjusted. FIG. 3 shows an example of this AC signal at 48. As evident in FIG. 3, the sinusoidal AC signal 48 for tracking corresponds to the modulated polarization of the laser light 36 and has a much lower frequency (e.g., is slowly varying) compared to the data communication portion 50 of the laser light 36.

Figure 4:
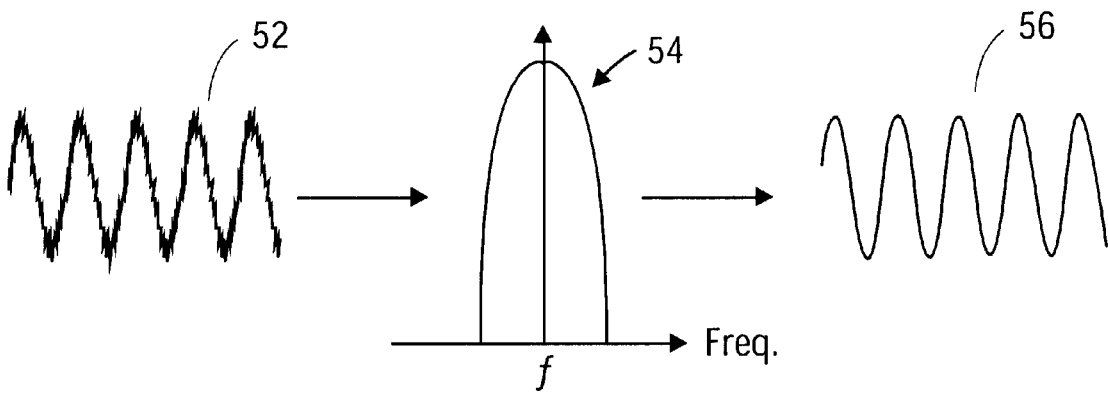
FIG. 4 illustrates a narrow-band filtering process that may be performed on the tracking signal of FIG. 3 to recover the tracking signal with reduced noise.

Electronics of the quad cell detector 44 can rectify, convert from analog to digital (A/D), demodulate, or perform other functions to quantify the resulting electronic AC signal(s) coming out of each quadrant of the quad cell detector 44, including providing these tracking signals or data to tracking control software or other receiver control units (not shown). FIG. 4 illustrates an embodiment of a method to recover a substantially noise-free version of the tracking signal outputted from the quad cell detector. In general, the electronic AC signal(s) outputted from the quad cell detector 44 may include the tracking signal, noise, and portions of the higher frequency data communication signal, collectively shown at 52 in FIG. 4. A narrow-band filter 54 centered at a frequency f of the tracking signal (which may be at the 100 kHz frequency of the signal V(t) of FIG. 1 that was used to modulate the polarization) can be used to filter the noise and data communication signal, thereby recovering a "clean" tracking signal at 56.

Figure 5:
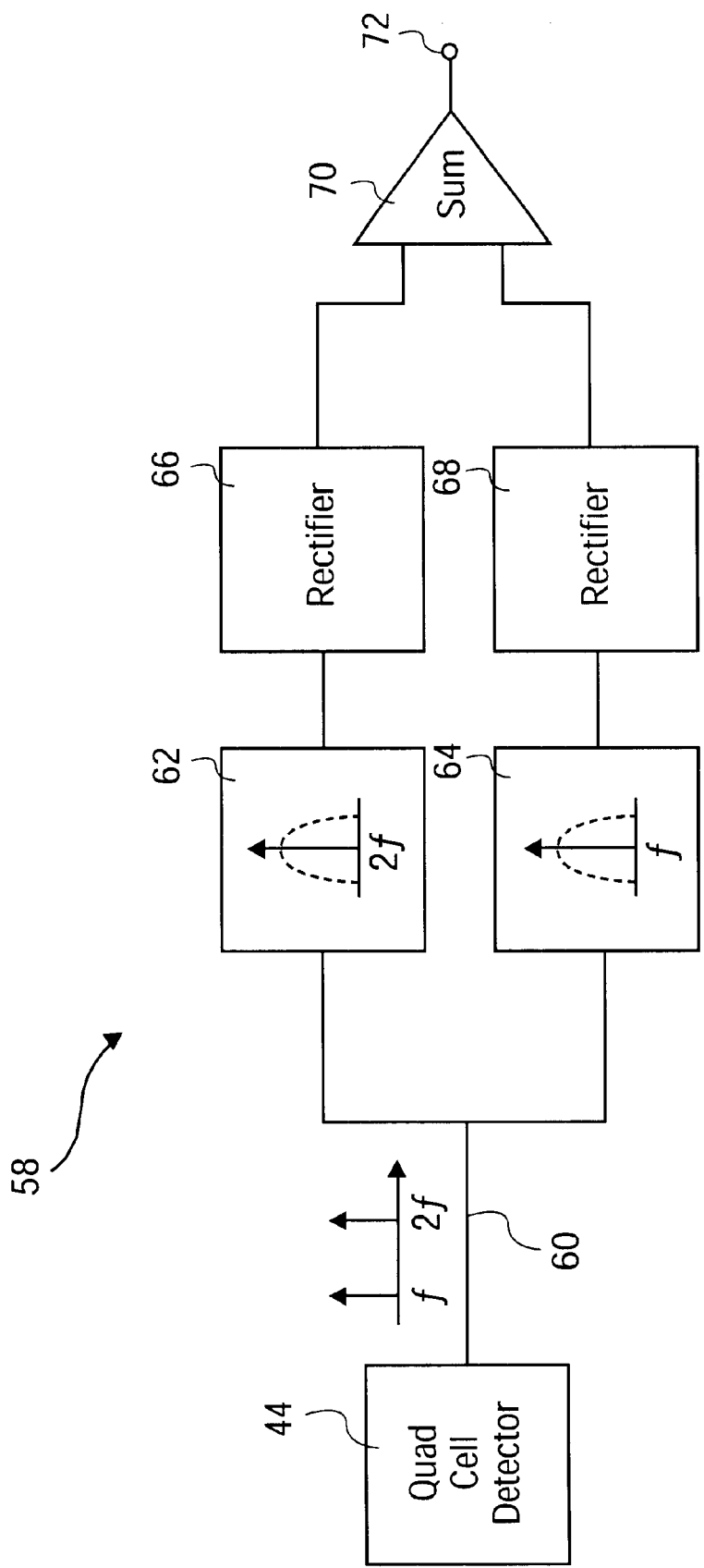
FIG. 5 is a functional block diagram of a circuit that can be used by the receiver of FIG. 2 to improve on the recovery of the tracking signal.

Often, thermal drift in the modulator 16 and/or the fibers 14, 20, 34 can cause the tracking signal to shift to a frequency 2f, even though the polarization was modulated at the frequency f, thereby resulting in signal components present at both of these frequencies. In some instances, the tracking signal may have a stronger amplitude at 2f rather than at f. Therefore, if the filter 54 is centered at f, then a signal that potentially has more strength at 2f may be unnecessarily sacrificed. To address this, FIG. 5 shows an embodiment of a circuit 58 that can recover the tracking signal from both the f and 2f frequencies. Initially, the quad cell detector 46 outputs electronic AC signal(s) 60 having components at f and 2f. A first branch of the circuit 58 recovers the 2f component from the electronic AC signal 60 using a first narrow-band filter 62 centered at 2f. A second branch of the circuit 58 recovers the f component from the electronic AC signal 60 using a second narrow-band filter 64 centered at f. The resulting signals are then fed into respective circuit units, such as full-wave/half-wave rectifier circuits 66 and 68 (or into similar types of circuits, such as absolute value circuits, square-law circuits, lock-in detector circuits, etc).

Outputs from the rectifier circuits 66 and 68 then form inputs into a summer circuit 70 that sums these inputs to get a final signal at 72. Consequently, the final signal 72 comprises the sum of the amplitudes of the tracking signals at f and 2f from each quadrant of the quad cell detector 44, and can be compared with each other to determine the relative strength of the optical signals detected by the quad cell detector 44 for tracking purposes.

A further embodiment of a receiver system that can process these electronic signals from the quad cell detector 44, and that can be used by the present invention, is disclosed in U.S. patent application Ser. No. 09/627,819, entitled "METHOD AND APPARATUS FOR TONE TRACKING IN WIRELESS OPTICAL COMMUNICATION SYSTEMS," filed Jul. 28, 2000 and incorporated by reference.

The analyzer 46 serves a distinctive purpose in the embodiments described herein. That is, without the analyzer 46, the quad cell detector 44 is largely unaffected by changes in polarization—the quad cell detector 44 cannot "see" the modulated polarization of the laser light 36 but instead can only detected changes in light intensity (e.g., it can detect only the modulation of the laser light's 36 amplitude or power). Accordingly, the analyzer 46 serves to convert the modulated polarization into an amplitude modulation that the quad cell detector 44 can detect. In effect, the analyzer 46 provides a way to turn the portion of the laser light 36 used for tracking completely "on" or completely "off," thereby potentially providing 100% amplitude modulation that is easily detected by the quad cell detector 44.

The purpose of using the PM fibers 14, 20, and 34 in the transmitter 10 is to hold the rotational state of the polarization constant. General manipulation of a PM fiber may alter the birefringence leading to a different polarization ellipticity, but generally does not easily rotate the polarization state. Changes in the birefringence of any PM fiber in the transmitter 10 changes the phase of the sinusoidal signal (e.g., the phase of the sinusoidally varying polarization state), but does not alter the detected amplitude modulation. Since the transmitter 10 utilizes amplitude and not phase, any effective birefringence change in the transmitter 10 (e.g., in the modulator 16, PM fiber 14, EDFA 32, etc.) generally does not effect the tracking performance.

To illustrate the effect of the optical system on the state of polarization, Jones Matrices may be employed to follow the optical/polarization train or diagrams 1–6 shown in FIGS. 1–2.

$$\begin{bmatrix} E_x \\ E_y \end{bmatrix} = \begin{bmatrix} 1 & 1 \\ 1 & 1 \end{bmatrix} \begin{bmatrix} 1 & 0 \\ 0 & e^{j\Gamma 2} \end{bmatrix} \begin{bmatrix} \cos(\phi) & \sin(\phi) \\ -\sin(\phi) & \cos(\phi) \end{bmatrix} \begin{bmatrix} 1 & 0 \\ 0 & e^{j\Gamma 1} \end{bmatrix} \begin{bmatrix} 1 \\ 1 \end{bmatrix} \frac{1}{2} \quad (1)$$

$$\phantom{xx} 6 \phantom{xxxxxx} 5 \phantom{xxxxxx} 4 \phantom{xxxxxxxxxxxx} 3 \phantom{xxxxxxxxx} 2 \phantom{xxxx} 1$$

In Equation (1), the matrices are multiplied from right to left. The identifying numbers beneath the matrices correspond to the reference numbers indicated by the diagrams 1–6 of FIGS. 1 and 2. The first matrix corresponds to linear input polarization on the modulator's 16 input that is 45 degrees relative to the $LiNbO_3$ eigenaxes. The second matrix corresponds to the electrically induced birefringence of the modulator 16. The third matrix is the rotation of the polarization ellipse by some arbitrary angle φ—this could occur if the fiber at this point were not polarization maintaining. The fourth matrix accounts for arbitrary birefringence induced by the PM fiber 20 between the modulator 16 and the EDFA 32, and any birefringence of the fiber within the EDFA 32. The fifth matrix is a linear polarizer just before the quad cell detector 44-assuming the linear polarizer has been rotated for maximum modulation depth for φ=0 (the third matrix changes the optimum rotation point for the analyzer 46).

The output E-field from the analyzer 46 is given by Ex and Ey of the fifth matrix. The corresponding output intensity on one axis is given by:

$$I_{ox}(t)=E_x*(\overline{E_x})=0.5[1+\sin(\Gamma 1(t))\sin(\Gamma 2)+\cos(2\phi)\cos(\Gamma 1(t))\cos(\Gamma 2)] \quad (2)$$

Figure 6:
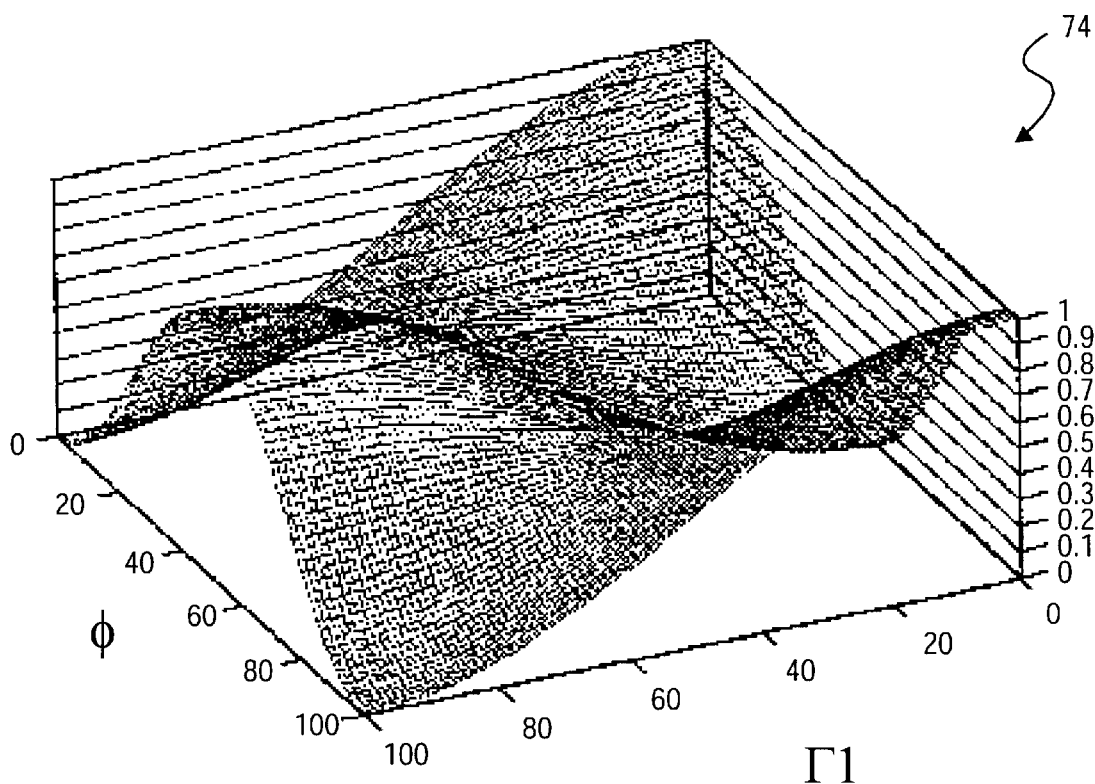
FIG. 6 is a plot of output intensity.

Setting Γ2 to zero in Equation (2) for the moment, and plotting the normalized output intensity $I_{ox}(t)$ from the quad cell detector 44 as a function of φ and Γ1 produces a plot 74 of FIG. 6, where the φ axis is on the left; the Γ1 axis is at the front; and the scale on the axes (0 to 100) corresponds to 0 to π radians. It is evident that the modulation depth can go to zero for a given analyzer rotation because of undesired rotations of the polarization ellipse in the system (such as from twists in a non-polarization maintaining fiber).

Figure 7:
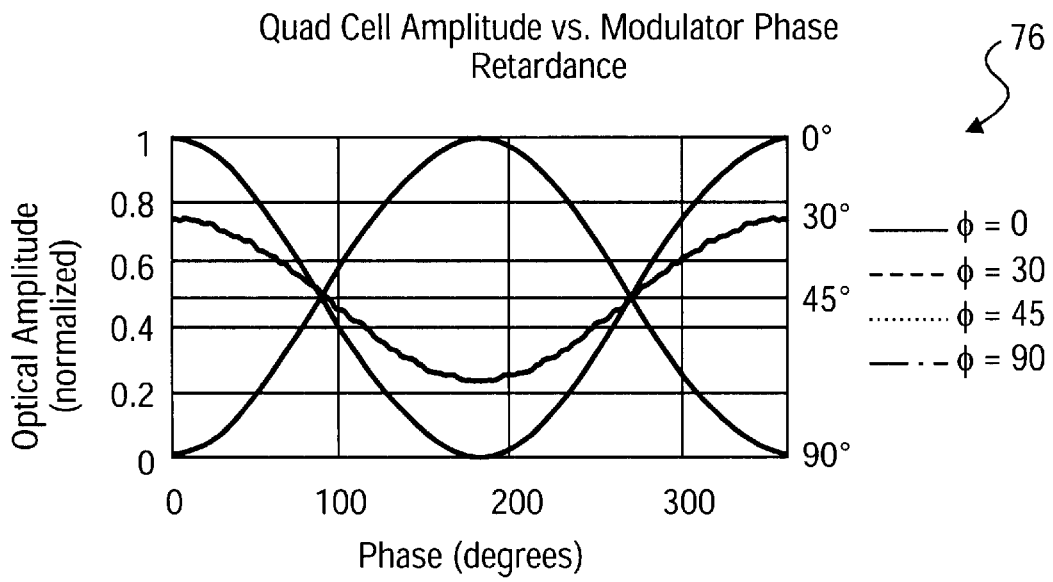
FIG. 7 is a plot of the output intensity versus modulator phase retardance.

Setting Γ2 to zero for the moment, Iox is plotted versus the modulator 16 phase retardance for various values of the polarization rotation φ in waveforms 76 of FIG. 7. From FIGS. 6 and 7, certain values of the rotation swill lead to no amplitude modulation. The idea of using polarization-maintaining components in the transmitter 10 of FIG. 1 is to prevent such rotation from occurring, and so one fixed analyzer 46 position at the quad cell detector 44 can give full modulation. Without PM fiber in the transmitter 10, it may be necessary to have an automatically rotatable analyzer 46 at the quad cell detector 46 in order to keep the amplitude modulation at the quad cell detector 46 at a maximum. Since such rotational changes are generally slowly varying, it is possible in an embodiment to use a control loop to keep the modulation depth peaked-up at the quad cell detector 44 by rotating the analyzer 46 for a maximum, if polarization maintaining components were not used.

To keep a substantially pure sinusoidal tone at the quad cell detector 44, the modulator 16 can be driven with a substantially symmetric triangle wave voltage that produces a peak phase change of 2π. For the sake of illustrative modeling, this triangle wave can be of the form:

$$\Gamma 1(t) = 2\pi \left( 0.5 + \sum_{k=1}^{\infty} \text{sinc}^2(k/2) \right) \quad (3)$$

Substituting Equation (3) in Equation (2) can produce the sinusoidal tone of FIG. 7. A peak applied voltage used at the modulator 16 to get 2π phase can be approximately 10 V in an embodiment.

Figure 8:
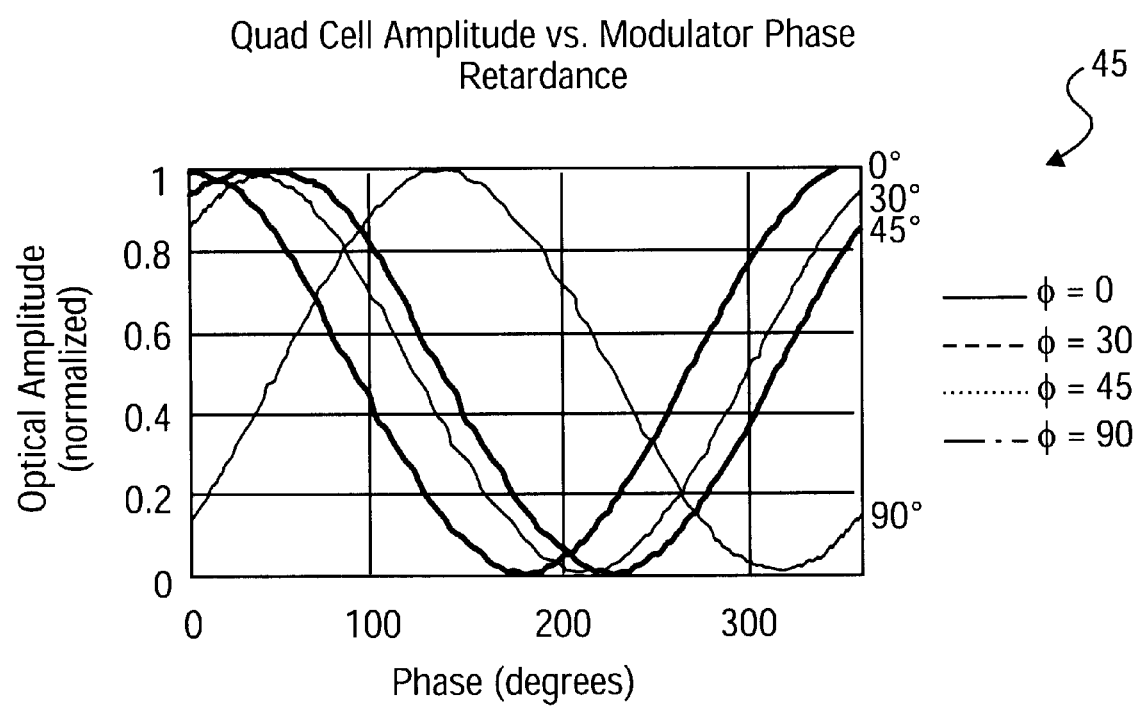
FIG. 8 is a plot of output intensity versus modulator phase retardance, showing phase offset effects.

If it is assumed that polarization maintaining components are used so that φ=0 degrees and that the analyzer 46 has been set for maximum modulation depth, the effect of varying birefringence in the PM fiber 14 is to simply shift the phase offset of the amplitude modulation on the quad cell detector 44. This is modeled by a changing Γ2 in Equation (2), which produces the waveforms 78 of FIG. 8—the phase offset changes, but not the modulation depth.

The modulator 16 can have a slightly different loss for the Transverse Electric (TE) and Transverse Magnetic (TM) modes. For an embodiment of the modulator 16, this loss difference is approximately 0.3 to 0.5 dB. In order to illustrate the effect of this, it is assumed Γ2=0, the input polarization to the modulator 16 is linear but at some arbitrary angle θ to the input axes, and a differential loss term $e^{-\Delta\alpha L}$ is added to the Jones Matrix for the modulator 16, where Δα is the absorption difference in cm$^{-1}$, and L is the modulator length:

$$\begin{bmatrix} E_x \\ E_y \end{bmatrix} = \begin{bmatrix} 1 & 1 \\ 1 & 1 \end{bmatrix} \begin{bmatrix} 1 & 0 \\ 0 & e^{j\Gamma 1}e^{-\Delta\alpha L} \end{bmatrix} \begin{bmatrix} \cos(\theta) \\ \sin(\theta) \end{bmatrix} \frac{1}{2} \quad (4)$$

$$I_{ox}(t)=E_x*(\overline{E_x})=0.5(\cos^2(\theta)+e^{-\Delta\alpha L}\sin(2\theta)\cos(\Gamma 1)+e^{-2\Delta\alpha L}\sin^2(\theta)) \quad (5)$$

From Equation (5), the peak-to-peak modulation depth can be shown to be $2e^{-\Delta\alpha L}\sin(2\theta)$. Therefore, θ=45 degrees is still the optimum input polarization angle, and the reduction in modulation depth is the same as the loss difference between the TE and TM modes in the modulator 16. For a 0.5 dB loss difference, the decrease in modulation is about 10%.

Figure 9A:
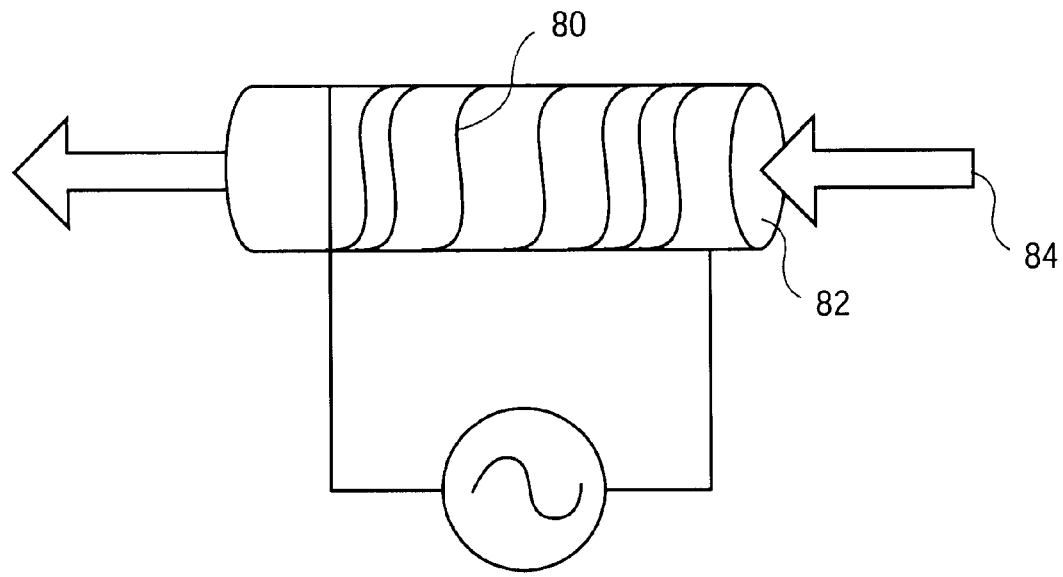
FIG. 9A is a perspective drawing of an embodiment of a modulator.

Some additional embodiments for performing polarization tracking can be used. In one such embodiment, the modulator 16 can be replaced with any suitable device that can changes the polarization sufficiently to get an adequate signal on the quad cell detector 44. Such alternate devices can include:

1) A Faraday rotator that uses a time-changing magnetic field to rotate the polarization (as opposed to using an electric field) at the output of the DFB laser 12. An example of such a modulator is shown in FIG. 9A, where a coil 80 of wire is wound around a Faraday rotator material 82. An alternating current is applied to the coil 80, and this time-varying electric field causes a time-varying magnetic field which changes the polarization of the incoming light signal 84. This is slightly different from the embodiments previously described above, in that the polarization in this alternative embodiment is truly being rotated as opposed to having only the polarization ellipticity changed. In this case, the transmitter 10 is designed to mitigate random changes in the circular birefringence, in order to prevent a reduction in amplitude modulation at the quad cell detector.

Figure 9B:
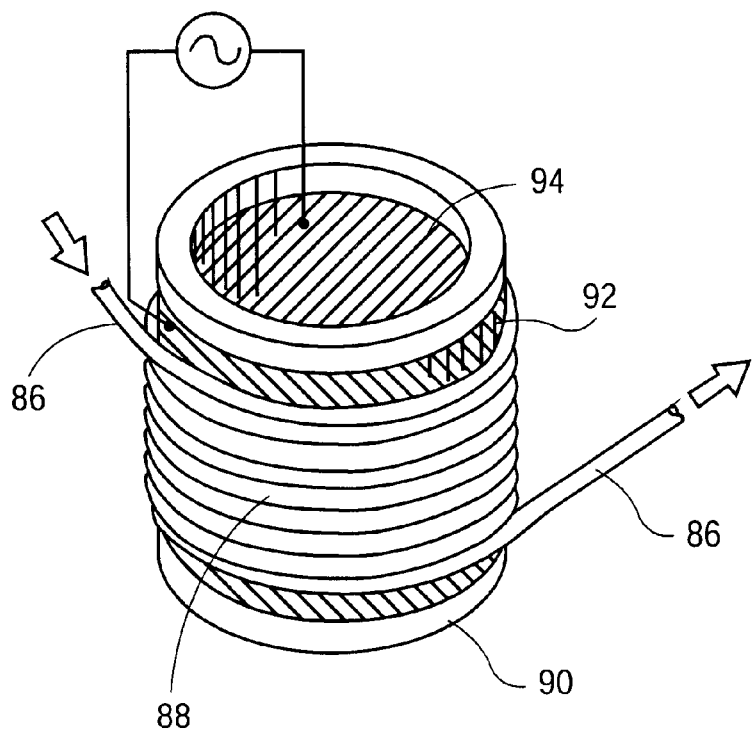
FIG. 9B is a perspective drawing of an alternative embodiment of a modulator.

2) A device which stretches or otherwise stresses a fiber in such way as to cause an induced birefringence. An example would be a twisted fiber wound tightly on a piezo cylinder or on a mandrel cylinder, as shown in FIG. 9B. The figure illustrates a fiber 86 wound into a coil 88 around a piezo or mandrel cylinder 90 having an inner electrode 94 and an outer electrode 92. A drive voltage applied to the piezo cylinder would expand the cylinder, creating a birefringence on the fiber. The effect on the polarization would be substantially the same as that achieved with an electro-optic modulator, such as the modulator 16.

3) A rotating half-wave plate at the output of the DFB laser 12 (similar in effect to the Faraday rotator), or a rotating quarter-wave plate (effect similar to the E-O modulator), driven mechanically by a motor.

Another embodiment eliminates or reduces the need for polarization maintaining EDFAs or splitters by monitoring the polarization state from the EDFA's 32 output, and then feeding back a signal that would change the EDFA's 32 input polarization state to achieve polarization stability. Such polarization controllers are commercially available from companies like E-Tek (Model FPCR). Basically, the polarization controller is placed between the DFB laser 12 and the EDFA 32 input. Changes in the polarization state at the EDFA 32 output fiber is detected and compensated for by changing the input controls on the polarization controller.

Yet another embodiment can modulate both the orientation of the polarization ellipse and the ellipticity in order to always produce some signal at the quad cell detector 44, regardless of what the optical system (e.g., the transmitter 10) is doing to the polarization. Such a modulator is produced by E-Tek as well. This embodiment has the advantage of not requiring polarization-maintaining components, but does not produce a pure modulation tone on the quad cell detector 44. Such an embodiment may require synchronization of the two modulation drive signals, to prevent a drift in relative signal strength on the quad cell detector 44.

Another embodiment can use a rotating analyzer 44 at the quad cell detector 44 in order to keep the quad signal peaked-up when the polarization gets inadvertently rotated (e.g., if PM fiber is not used in the transmitter 10). This embodiment functions if little or no linear birefringence were induced by the components of the transmitter 10, which is would occur if non-PM fiber is used and is not bent or wound in tight loops.

Some of the advantages of polarization tracking implemented by the various embodiments described herein include the following:

1) No additional laser source devoted to tracking is needed, especially in the case of a backhaul or broadcast communication system, where a higher-powered tracking laser may be necessary to overcome link losses;

2) Full 100% modulation depth of the optical communication signal at the tracking "lone" frequency is possible (in contrast to, for example, a 5% modulation of the communication signal for tracking in other types of tracking systems), thereby resulting in a 20-fold increase in tracking signal strength at the quad cell detector 44;

3) The polarization tracking system can operate at IR frequencies;

4) Since the modulation uses a sinusoidal tone, the system can use a narrow-band electronic filter (1–10 kHz, for example) in the electronics of the quad cell detector 44 to filter out wide-band noise (in contrast to data tracking which has a bandwidth of ~200 MHz-all else being equal, this narrower filter can increase the tracking sensitivity by one to two orders of magnitude compared to data tracking, depending on the electronic filter noise and actual filter bandwidth used); and 5) Varying the data rate of the data communication signal has no effect on tracking electronics performance, and similarly, full 100% modulation of the polarization for tracking purposes has substantially no adverse effect on the data communication signal.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications, such as those described above, are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:

modulating a polarization of a light signal;

transmitting the light signal having the modulated polarization through free space;

receiving the light signal having the modulated polarization; and generating an amplitude-modulated light signal based on the modulated polarization and using the amplitude-modulated light signal to perform tracking of an orientation of a receiver component with respect to the received light signal.

2. The method of claim 1 wherein modulating the polarization of the light signal comprises:

sending the light signal through a polarization maintaining fiber to a modulator, the polarization maintaining fiber being structured to hold a rotational state of the polarization substantially constant; and at the modulator, electrically inducing a birefringence to change a polarization ellipticity of the light signal.

3. The method of claim 1 wherein receiving the light signal having the modulated polarization comprises:

directing a first portion of the received light signal to a communication detector of the receiver to detect data in the light signal; and directing a second portion of the received light signal to an optical detector of the receiver to perform the tracking.

4. The method of claim 1 wherein generating the amplitude-modulated light signal based on the modulated polarization and using the amplitude-modulated light signal to perform the tracking comprises:

directing the amplitude-modulated light signal to an optical detector;

generating an electronic signal corresponding to the amplitude-modulated light signal; and filtering the electronic signal to obtain a tracking signal for the tracking.

5. The method of claim 4 wherein filtering the electronic signal to obtain the tracking signal comprises:

filtering the electronic signal at a first frequency corresponding to the electronic signal;

filtering the electronic signal at a second frequency that is a frequency multiple of the first frequency; and summing values corresponding to amplitudes of the electronic signal at the first and second frequencies and using the summed values for the tracking.

6. The method of claim 1 wherein modulating the polarization of the light signal comprises using a time-changing magnetic field to rotate the polarization of the light signal.

7. The method of claim 1 wherein modulating the polarization of the light signal comprises:

winding a fiber on a mandrel cylinder to stretch the fiber; and applying a voltage to the mandrel cylinder to induce a birefringence in the fiber to change the polarization of the light signal sent through the fiber.

8. An optical receiver, comprising:

an analyzer to detect a modulated polarization of a light signal received from free space and to generate an amplitude-modulated light signal corresponding to the modulated polarization; and an optical detector to receive the amplitude-modulated light signal from the analyzer and to generate an electronic signal corresponding to the received amplitude-modulated light signal that is useable to perform tracking of an orientation of a receiver component with respect to the light signal received from free space.

9. The optical receiver of claim 8 wherein the analyzer includes an axis of transmission and is capable of passing portions of the light signal having a polarization state increasingly aligned with the axis of transmission than portions of the light signal having a polarization decreasingly aligned with the axis of transmission.

10. The optical receiver of claim 8, further comprising a filter coupled to the optical detector and having a passband centered on a frequency corresponding to a tracking signal forming part of the electronic signal, the filter being capable to filter the tracking signal from the electronic signal.

11. The optical receiver of claim 10, further comprising:
another filter coupled to the optical detector and having a passband centered on a frequency multiple of the frequency corresponding to the tracking signal;
a circuit unit coupled to outputs of both filters to generate values representative of amplitudes of signals passed by both filters; and
a summing circuit coupled to the circuit units to sum the values provided by the circuit units to obtain a final value representative of the amplitude of the tracking signal.

12. The optical receiver of claim 11 wherein the circuit units comprise rectifier circuits.

13. The optical receiver of claim 8, further comprising a beam splitter to split the received light signal into first and second portions, the beam splitter being capable to direct the first portion to a data communication signal detector and the second portion to the analyzer.

14. The optical receiver of claim 8 wherein the analyzer comprises a rotating analyzer.

15. An optical communication system, comprising:
an optical transmitter having a unit to generate a light signal and having a modulator coupled to the unit to modulate a polarization of the light signal by inducing a birefringence to change a characteristic of the polarization, the optical transmitter being capable to transmit the light signal having the modulated polarization through free space; and
an optical receiver having an analyzer to detect the modulated polarization of the light signal received through free space from the optical transmitter and to generate an amplitude-modulated light signal corresponding to the modulated polarization, and having an optical detector to receive the amplitude-modulated light signal from the analyzer and to generate an electronic signal corresponding to the received amplitude-modulated light signal that is useable to perform tracking of an orientation of a component of the optical receiver with respect to the light signal received through free space.

16. The system of claim 15 wherein the optical transmitter further comprises a polarization maintaining fiber coupled between the unit and the modulator to hold a rotational state of the polarization substantially constant, wherein the characteristic of the polarization comprises a polarization ellipticity of the light signal, the modulator being capable of electrically inducing the birefringence to change the polarization ellipticity of the light signal to modulate the polarization.

17. The system of claim 15 wherein the optical receiver further comprises:
a first filter coupled to the optical detector and having a passband centered on a frequency corresponding to a tracking signal forming part of the electronic signal, the first filter being capable to filter the tracking signal from the electronic signal;
a second filter coupled to the optical detector and having a passband centered on a multiple of the frequency corresponding to the tracking signal;
a circuit unit coupled to outputs of the first and second filters to generate values representative of amplitudes of signals passed by both filters; and
a summing circuit coupled to the circuit units to sum the values provided by the circuit units to obtain a final value representative of the amplitude of the tracking signal.

18. The system of claim 17 wherein the circuit units comprise rectifier circuits.

19. An apparatus, comprising:
an optical transmitter having a unit to generate a first light signal and having a modulator coupled to the unit to modulate a polarization of the first light signal by inducing a birefringence to change a characteristic of the polarization, the optical transmitter being capable to transmit the first light signal having the modulated polarization; and
an optical receiver having an analyzer to detect a modulated polarization of a received second light signal and to generate an amplitude-modulated light signal corresponding to the modulated polarization of the second light signal, and having an optical detector to receive the amplitude-modulated light signal from the analyzer and to generate an electronic signal corresponding to the received amplitude-modulated light signal that is useable to perform tracking of the optical receiver with respect to the received second light signal.

20. The apparatus of claim 19 wherein the optical receiver comprises:
a first filter coupled to the optical detector and having a passband centered on a frequency corresponding to a tracking signal forming part of the electronic signal, the first filter being capable to filter the tracking signal from the electronic signal;
a second filter coupled to the optical detector and having a passband centered on a multiple of the frequency corresponding to the tracking signal;
a circuit unit coupled to outputs of the first and second filters to generate values representative of amplitudes of signals passed by both filters; and
a summing circuit coupled to the circuit units to sum the values provided by the circuit units to obtain a final value representative of the amplitude of the tracking signal.

21. The apparatus of claim 20 wherein the circuit units comprise rectifier circuits.

22. The apparatus of claim 19 wherein the optical transmitter further comprises a polarization maintaining fiber coupled between the unit and the modulator to hold a rotational state of the polarization substantially constant, wherein the characteristic of the polarization comprises a polarization ellipticity of the first light signal, the modulator being capable of electrically inducing the birefringence to change the polarization ellipticity of the first light signal to modulate the polarization.

23. The apparatus of claim 19 wherein the optical receiver further comprises a beam splitter to split the received second light signal into first and second portions, the beam splitter being capable to direct the first portion to a data communication signal detector and the second portion to the analyzer.

24. A method, comprising:

modulating a polarization of a light signal;

transmitting the light signal having the modulated polarization;

receiving the light signal having the modulated polarization; and generating an amplitude-modulated light signal based on the modulated polarization and using the amplitude-modulated light signal to perform a tracking of a receiver component with respect to the received light signal, wherein receiving the light signal having the modulated polarization comprises:

directing a first portion of the received light signal to a communication detector of the receiver to detect data in the light signal; and directing a second portion of the received light signal to an optical detector of the receiver to perform the tracking.

25. The method of claim 24 wherein modulating the polarization of the light signal comprises:

sending the light signal through a polarization maintaining fiber to a modulator, the polarization maintaining fiber being structured to hold a rotational state of the polarization substantially constant; and at the modulator, electrically inducing a birefringence to change a polarization ellipticity of the light signal.

26. The method of claim 24 wherein generating the amplitude-modulated light signal based on the modulated polarization and using the amplitude-modulated light signal to perform the tracking comprises:

directing the amplitude-modulated light signal to an optical detector;

generating an electronic signal corresponding to the amplitude-modulated light signal; and filtering the electronic signal to obtain a tracking signal for the tracking.

27. The method of claim 26 wherein filtering the electronic signal to obtain the tracking signal comprises:

filtering the electronic signal at a first frequency corresponding to the electronic signal;

filtering the electronic signal at a second frequency that is a frequency multiple of the first frequency; and summing values corresponding to amplitudes of the electronic signal at the first and second frequencies and using the summed values for the tracking.

28. The method of claim 24 wherein modulating the polarization of the light signal comprises using a time-changing magnetic field to rotate the polarization of the light signal.

29. An optical receiver, comprising:

an analyzer to detect a modulated polarization of a received light signal and to generate an amplitude-modulated light signal corresponding to the modulated polarization;

an optical detector to receive the amplitude-modulated light signal from the analyzer and to generate an electronic signal corresponding to the received amplitude-modulated light signal that is useable to perform tracking with respect to the received light signal; and a beam splitter to split the received light signal into first and second portions, the beam splitter being capable to direct the first portion to a data communication signal detector and the second portion to the analyzer.

30. The optical receiver of claim 29 wherein the analyzer includes an axis of transmission and is capable of passing portions of the light signal having a polarization state increasingly aligned with the axis of transmission than portions of the light signal having a polarization decreasingly aligned with the axis of transmission.

31. The optical receiver of claim 29, further comprising a filter coupled to the optical detector and having a passband centered on a frequency corresponding to a tracking signal forming part of the electronic signal, the filter being capable to filter the tracking signal from the electronic signal.

32. The optical receiver of claim 31, further comprising:

another filter coupled to the optical detector and having a passband centered on a frequency multiple of the frequency corresponding to the tracking signal;

a circuit unit coupled to outputs of both filters to generate values representative of amplitudes of signals passed by both filters; and a summing circuit coupled to the circuit units to sum the values provided by the circuit units to obtain a final value representative of the amplitude of the tracking signal.

33. An optical communication system, comprising:

an optical transmitter having a unit to generate a light signal and having a modulator coupled to the unit to modulate a polarization of the light signal by inducing a birefringence to change a characteristic of the polarization, the optical transmitter being capable to transmit the light signal having the modulated polarization; and an optical receiver including:

an analyzer to detect the modulated polarization of the light signal received from the optical transmitter and to generate an amplitude-modulated light signal corresponding to the modulated polarization;

an optical detector to receive the amplitude-modulated light signal from the analyzer and to generate an electronic signal corresponding to the received amplitude-modulated light signal that is useable to perform tracking of the optical receiver with respect to the received light signal; and a beam splitter to split the light signal received from the optical transmitter into first and second portions, the beam splitter being capable to direct the first portion to a data communication signal detector and the second portion to the analyzer.

34. The system of claim 33 wherein the optical transmitter further comprises a polarization maintaining fiber coupled between the unit and the modulator to hold a rotational state of the polarization substantially constant, wherein the characteristic of the polarization comprises a polarization ellipticity of the light signal, the modulator being capable of electrically inducing the birefringence to change the polarization ellipticity of the light signal to modulate the polarization.

35. The system of claim 33 wherein the optical receiver further comprises:

a first filter coupled to the optical detector and having a passband centered on a frequency corresponding to a tracking signal forming part of the electronic signal, the first filter being capable to filter the tracking signal from the electronic signal;

a second filter coupled to the optical detector and having a passband centered on a multiple of the frequency corresponding to the tracking signal;

a circuit unit coupled to outputs of the first and second filters to generate values representative of amplitudes of signals passed by both filters; and a summing circuit coupled to the circuit units to sum the values provided by the circuit units to obtain a final value representative of the amplitude of the tracking signal.

36. An apparatus, comprising:

an optical transmitter having a unit to generate a first light signal and having a modulator coupled to the unit to modulate a polarization of the first light signal by inducing a birefringence to change a characteristic of the polarization, the optical transmitter being capable to transmit the first light signal having the modulated polarization; and an optical receiver including:

an analyzer to detect a modulated polarization of a received second light signal and to generate an amplitude-modulated light signal corresponding to the modulated polarization of the second light signal;

an optical detector to receive the amplitude-modulated light signal from the analyzer and to generate an electronic signal corresponding to the received amplitude-modulated light signal that is useable to perform tracking of a component of the optical receiver with respect to the received second light signal; and a beam splitter to split the received second light signal into first and second portions, the beam splitter being capable to direct the first portion to a data communication signal detector and the second portion to the analyzer.

37. The apparatus of claim 36 wherein the optical receiver comprises:

a first filter coupled to the optical detector and having a passband centered on a frequency corresponding to a tracking signal forming part of the electronic signal, the first filter being capable to filter the tracking signal from the electronic signal;

a second filter coupled to the optical detector and having a passband centered on a multiple of the frequency corresponding to the tracking signal;

a circuit unit coupled to outputs of the first and second filters to generate values representative of amplitudes of signals passed by both filters; and a summing circuit coupled to the circuit units to sum the values provided by the circuit units to obtain a final value representative of the amplitude of the tracking signal.

38. The apparatus of claim 36 wherein the optical transmitter further comprises a polarization maintaining fiber coupled between the unit and the modulator to hold a rotational state of the polarization substantially constant, wherein the characteristic of the polarization comprises a polarization ellipticity of the first light signal, the modulator being capable of electrically inducing the birefringence to change the polarization ellipticity of the first light signal to modulate the polarization.

39. An optical receiver, comprising:

an analyzer to detect a modulated polarization of a light signal received through free space and to generate a modulated output light signal corresponding to the modulated polarization; and an optical detector to receive the modulated output light signal from the analyzer and to generate an electronic signal, corresponding to the received modulated output light signal, that is useable to perform tracking of an orientation of a receiver component with respect to the light signal received through free space.

40. The optical receiver of claim 39 wherein the modulated output light signal comprises an amplitude-modulated light signal.

* * * * *